(12) United States Patent
Barnes

(10) Patent No.: US 6,364,609 B1
(45) Date of Patent: Apr. 2, 2002

(54) WIND TURBINE HAVING GROUND WINCH PIVOT ERECTION SUPPORT STRUCTURE

(76) Inventor: Robert J. Barnes, P.O. Box 341601, Milwaukee, WI (US) 53234-1601

( * ) Notice: Subject to any disclaimer, the term of this patent is extended or adjusted under 35 U.S.C. 154(b) by 0 days.

(21) Appl. No.: 09/561,959

(22) Filed: May 1, 2000

(51) Int. Cl.[7] .................................................. F01D 5/00
(52) U.S. Cl. ................................ 416/142; 416/DIG. 6
(58) Field of Search ........................... 416/142, DIG. 6, 416/244 R, 246, 148 R; 415/4.2, 4.4, 2.1, 907, 213.1

(56) References Cited

U.S. PATENT DOCUMENTS

| | | | | |
|---|---|---|---|---|
| 460,837 | A | * 10/1891 | Addis ..................... | 416/142 R |
| 4,217,738 | A | * 8/1980 | Smith ........................ | 52/40 |
| 4,396,843 | A | * 8/1983 | Martinez Parra .......... | 290/55 |
| 4,792,700 | A | * 12/1988 | Ammons .................... | 290/55 |
| 5,252,029 | A | * 10/1993 | Barnes ...................... | 416/142 |
| 5,630,705 | A | 5/1997 | Eikelenboom ............. | 416/142 |

OTHER PUBLICATIONS

SAND–84–1287 D. E. Berg Design 34–Meter Turbine pp. 3+ 5–16.
ISBNO–917352–06–8 J. Park The Wind Power Book pp. 78, 79, 96.
SAND78–0014 Klimas Aerodynamic Prediction Schemes pp. 3, 12.
SAND90–1615 Ashwill Structural Response Measurements pp. 47–54.
SAND91–2228 Ashwill Measured Data 34–Meter Turbine p. 59.

* cited by examiner

Primary Examiner—Edward K. Look
Assistant Examiner—James M McAleenan

(57) ABSTRACT

A Darrieus-type vertical axis wind turbine is disclosed. The turbine includes an erection hinge between the support structure and support structure anchor which permits assembly of the rotor shaft and blades and gear box and electric generator very close to ground level. Using the three rotor shaft upper bearing guy cables to hold and pivot erect all non-anchor turbine components from a horizontal to a vertical operating position around the support anchor hinge. Support structure adjustable leveling and support bolts used to minimize erection hinge stress during turbine operation. Erection hinge offset beams to minimize crushing scissors action between the support structure and support structure anchor during pivot erection. Horizontal assembly and ground winch erection pivoting replaces the need for an expensive tall crane, with a rolling gantry and chain gear hoist.

7 Claims, 9 Drawing Sheets

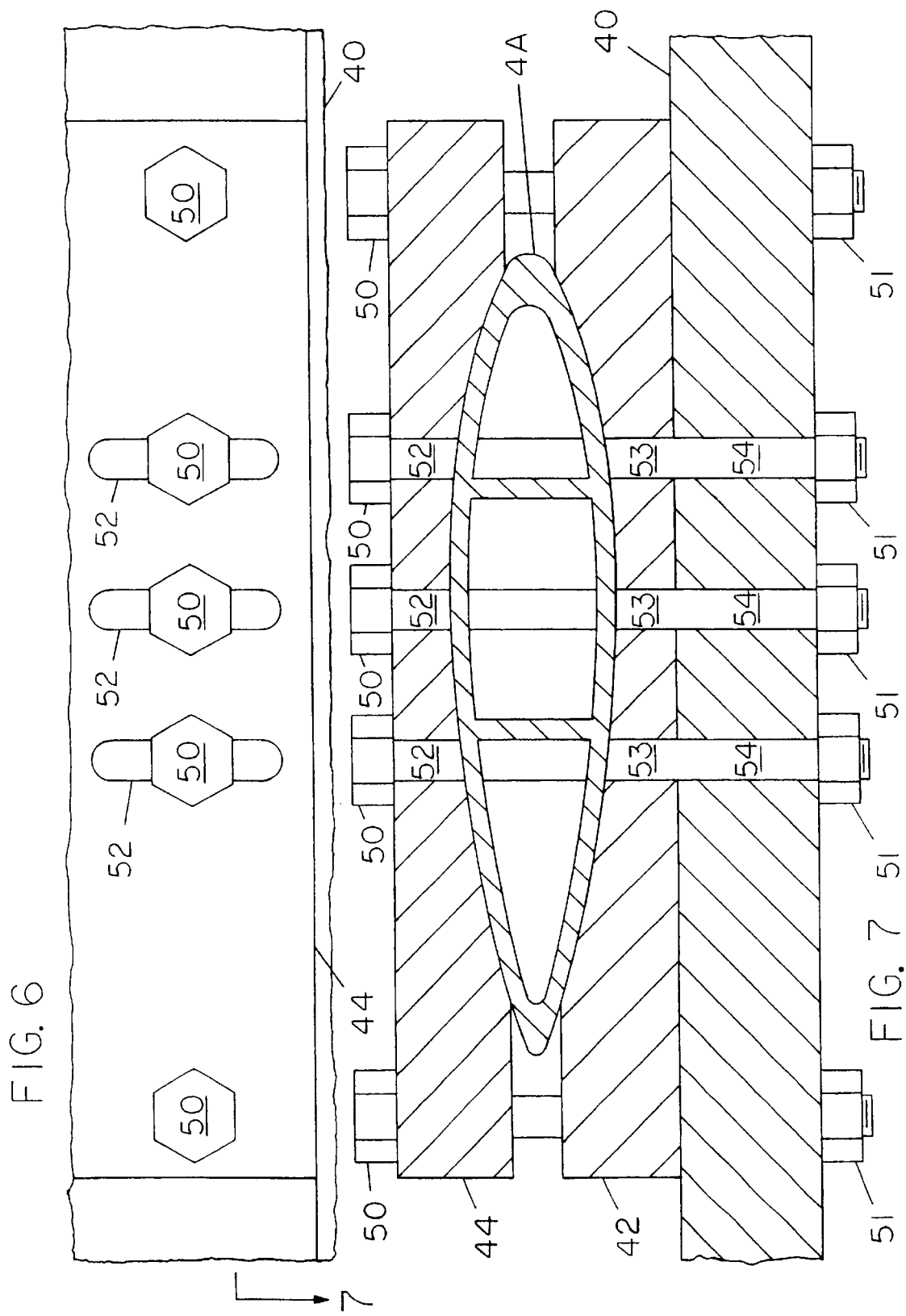

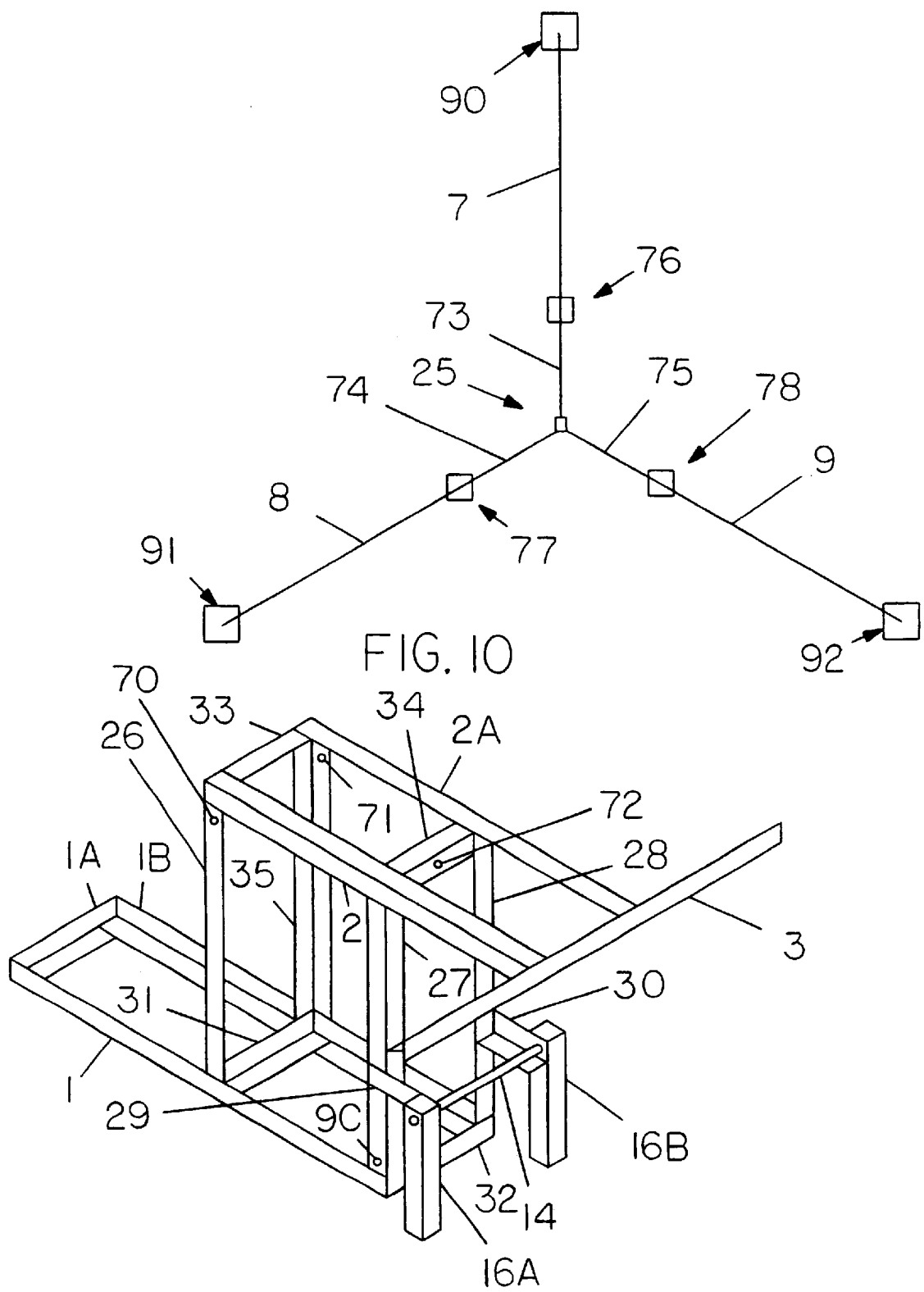

WIND TURBINE HAVING GROUND WINCH PIVOT ERECTION SUPPORT STRUCTURE

DRAWINGS

SEQUENCE LISTING

Not Applicable

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

1. Field of the Invention

This invention relates to vertical axis wind turbines, which are used to convert wind energy.

2. Description of the Related Art

The Darrieus-type vertical axis wind turbine, (VAWT) having its rotating shaft traverse to the air stream, was patented by G. M. Darrieus in the United States in 1931 U.S. Pat. No. 1,835,018. The Darrieus-type vertical axis wind turbine is said to resemble an egg-beater with curved blades connected at both ends to the ends of the rotating shaft. Each blade of the turbine is symmetrical in cross section and is curved in the shape of a perfectly flexible cable of uniform density and cross section would assume if spun about a vertical axis. This curved blade shape is represented by the Greek word "troposkein" meaning turning rope. With VAWT blades having a troposkein shape, major stresses are in tension when the rotor is spinning. Thus, rotation of the turbine rotor will not cause the blades to bend significantly nor to produce significant blade bending stresses.

The operational principal of the vertical axis wind turbine (VAWT) is an alogous to the aerodynamics of a wing (airfoil) as is described in "The Wind Power Book" pages 78 and 79 by Jack Park. Fluid forces on the blades of the VAWT are divided into lift and drag forces. A component of the lift force causes rotor rotation and a component of the drag force opposes rotor rotation. The rotor torque will be positive as long as the driving component of the lift force exceeds the opposing component of the drag force. With such a rotor the aerodynamic efficiency is low or negative at rotor tip speed over wind speed ratios below 3 or above 9. Consequently, a motor must usually be employed to start the turbine.

Interest in the Darrieus-type vertical axis wind turbines has been stimulated in recent years by the energy crisis and the important advantages of such turbines over horizontal axis machines which include the following: (1) The VAWT accepts wind from all directions and therefore does not require costly direction orientating equipment. (2) The VAWT does not require adjustment of blade pitch to limit maximum power output at high wind speeds. (3) The generator, speed reducer and brake do not have to be supported as part of the wind orientating platform. (4) The VAWT blades are supported at both ends which makes for less expensive and longer lasting blades.

VAWT designs have advanced and have inherent advantages over horizontal axis machines. But a VAWT is needed to be more cost effective in construction, erection, maintenance and operation.

Inventors have made attempts to create a VAWT that will prosper with the stable energy price following the panic of 1973.

U.S. Pat. No. 5,252,029 to Barnes discloses a VAWT having both an erection and hold down gin poles that allow pivot erection using a ground mounted winch. These gin poles provide tension reduction for the erection and hold down cables that hold the turbine together during pivot erection. This disclosure only describes two assembly cables. This disclosure only accounts for forces and movement in the plane containing the two cables and the major axis of the VAWT rotor shaft. The drawings in this disclosure show alignment between the major axis of the drive train frame and the major axis of the rotor shaft.

Forces and rotor shaft movement may develop in other planes. The plane, at right angles to the two cables and rotor shaft axis plane, is the plane where extra forces and rotor movement is most likely. These extra forces and rotor movement will occur due to the rolling of the cables in the gin pole guide cups causing misalignment. Once the rotor axis starts to leave the drive train frame axis plane, right angle plane forces increase. This movement and right angle plane force increase could cause rotor bearing damage. This rotor shift, during erection, could limit rotor length and therefore energy conversion rating.

BRIEF SUMMARY OF THE INVENTION

In accordance with the present invention a vertical axis wind turbine assembly is connected by a hinge to a ground embedded anchor. The turbine assembly is assembled in a horizontal position close to the ground. This turbine assembly is held together by the three upper bearing guy cables. One guy cable is strung over an erection gin pole and connected to an anchor mounted winch. The other two guy cables are strung over a combined hold down and stabilizing T-shaped pole to hold together and align the assembly during pivot erection to a vertical position.

The objects and advantages of this invention are:

A. To provide a vertical axis wind turbine design with improved overall cost effectiveness, particularly construction and installation cost.

B. To provide a cost effective vertical axis wind turbine design for turbines of practical commercial and industrial power conversion ratings.

C. This cost effective VAWT must also survive high winds while in a fully installed condition.

D. This cost effective VAWT design must also inhibit rotor torque ripple, guy cable vibration and rotor blade fatigue. The objects of this invention have been obtained with three principal advantages over previous vertical axis wind turbine designs:

1. An additional set of guy cables to hold the central support structure and lower rotor bearing in a vertical position. This central support structure guy cable set reduces the cost of the central support structure. The central support structure principally consists of the drive train frame.

2. Pivoting the entire turbine, except the central support structure anchor, during erection. This invention pivots the support structure and rotor lower bearing also the rotor shaft and rotor upper bearing assembly from a horizontal to a vertical position. The turbine single axis pivot pin or pins are mounted close to the ground in a central support structure anchor. This central support structure anchor is embedded in the ground.

3. The use of erection and combination hold down and stabilizing gin poles combined with a low erection pivot axis allows for turbine erection without an expensive tall crane. The turbines of this invention have been sized (10 horsepower, 25 HP. 50 HP. and 75 HP.) and designed to allow cable pivoting using a ground mounted winch.

Additional design features of this invention are:

1. A flexible rotor shaft to speed reducer shaft coupling. This shaft coupling has replaceable flex elements to reduce rotor torque ripple. This shaft coupling reduce rotor blade, rotor shaft and speed reducer fatique.
2. A simple inexpensive guy cable vibration dampening device installed in each upper rotor bearing cable. These cable vibration devices reduce cable vibration and cable tension and therefore rotor bearing wear.
3. Conservative sizing of guy cables for withstanding high winds with turbine fully installed.
4. A spring set electrically released emergency stop and parking brake is used. This brake is sized and engaged to stop the turbine rotor in high winds.
5. The low pivot erection axis allows the use of inexpensive low lift equipment for turbine component assembly. This low pivot axis reduces turbine maintenance costs.
6. The rotor shafts, rotor blade hubs, rotor blades and blade connections have been sized and designed to withstand rotor run away in high winds.
7. The practical size of the turbines of this invention allows for cost effective adaptation of standard industrial components. These standard components are tapered roller bearings, in-line gearboxes, induction motor generators, steel and aluminum pipe, plate and beams.
8. Contoured fit blade clamps, used with slotted mounting holes, helps reduce rotor blade stress due to flatwise modal vibration.
9. Specially designed extruded hollow aluminum beams that can be easily machined and bolted together to form blade hubs. Bolted blade hubs avoids the cost of welding. Still further turbine features and advantages will become apparent from consideration of the ensuing descriptions and drawings.

BRIEF DESCRIPTION OF THE DRAWINGS

FIG. 6 A detailed expanded side view from a dashed circle section in FIG. 5.

FIG. 7 A detailed sectional view of FIG. 6.

FIG. 9 A perspective view of the drive train frame in the operating position.

FIG. 10 A top plan view of the turbine assembly, guy cables and guy cable anchor concrete footing layout.

DETAILED DESCRIPTION OF THE INVENTION

Figure 1:
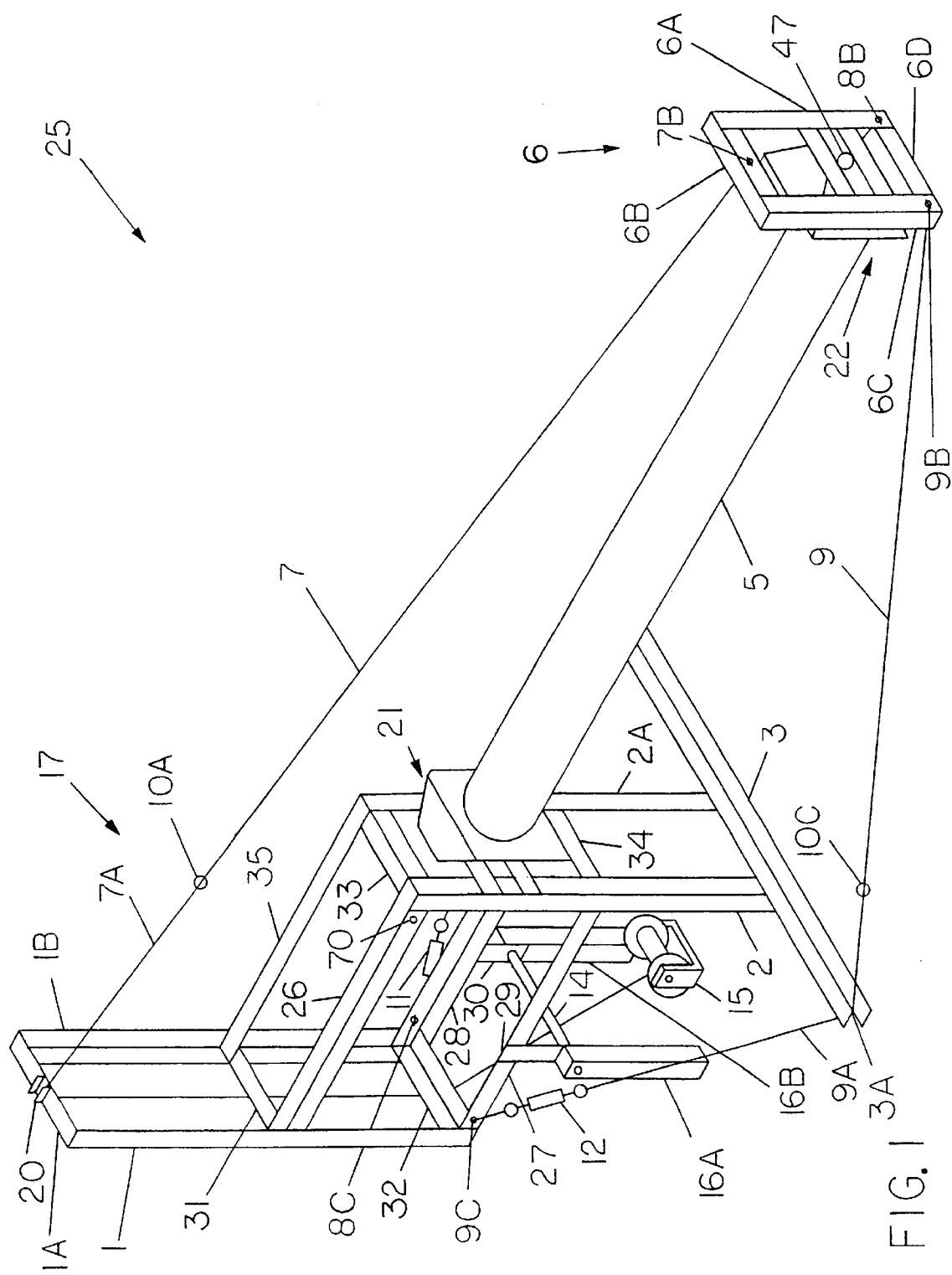
FIG. 1 A perspective view of the 25 HP. two blade VAWT (blades not shown) ready to be pivot erected to the vertical position.
Figure 2:
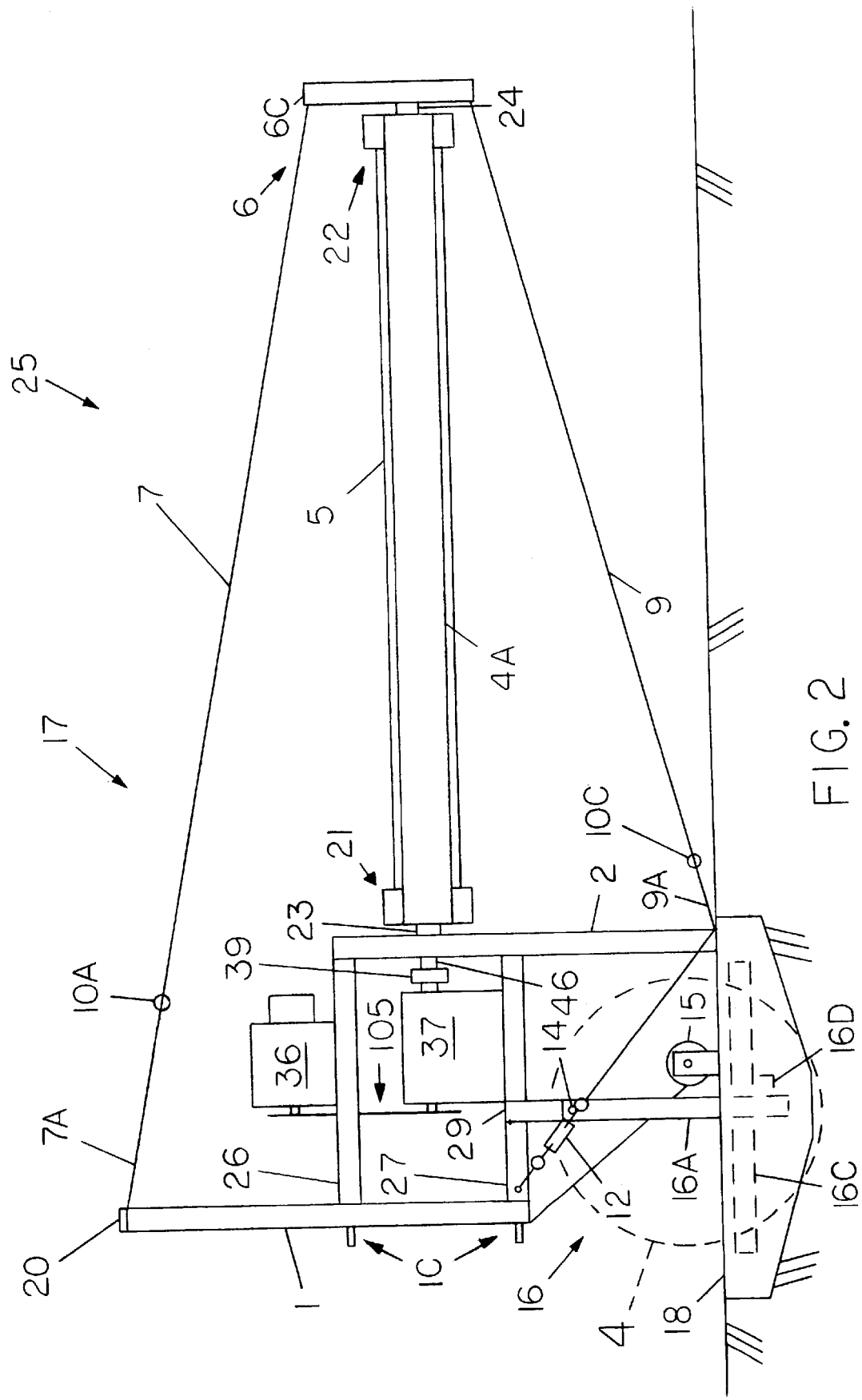
FIG. 2 A plan side view of the same 25 HP. two blade VAWT (blades shown) ready to be pivot erected to the vertical position.
Figure 3:
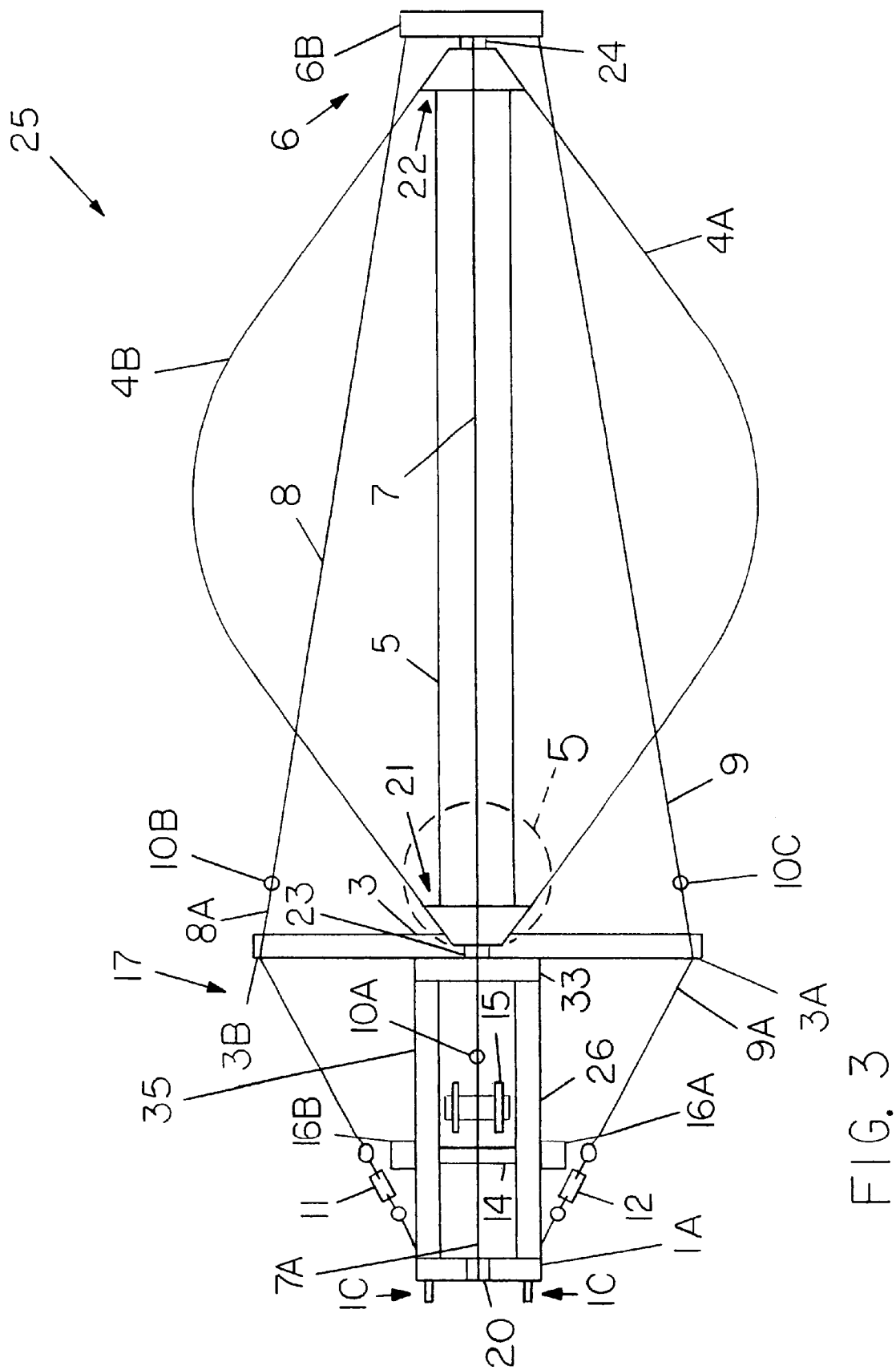
FIG. 3 A plan top view of the same 25 HP. two blade VAWT (blades shown) ready to be pivot erected to the vertical position.

FIGS. 1, 2 and 3 show the same Darrieus-type 25 HP. two blade vertical axis wind turbine assembly 25 of this invention in a horizontal position. In these drawing figures the vertical axis wind turbine 25 consists of all the elements shown except for elements numbered 7A, 8A, 9A, 10A, 10B, 10C, 11, 12 and 15. Elements 7A, 8A, 9A, 10A, 10B, 10C, 11, 12 and 15 are used for turbine 25 assembly, erection, lowering and disassembly.

In FIGS. 1, 2 and 3 drive train frame 17 is the entire central support structure. Drive train frame 17 is composed of several two flange 90 degree angle metal beams. Other hollow closed rectangular cross section four flange beams or rectangular three flange u-channel beams can also be used to build drive train frame 17. The two flange 90 degree beam has the best weight to rigidity ratio of all rectangular beams.

In FIG. 1 the drive train frame 17 is composed of several two flange 90 degree beams 1, 1A, 1B, 2, 2A, 3, 26, 27, 28, 29, 30, 31, 32, 33, 34 and 35. In FIG. 1 beams 1B, 2, 3, 26, 28, 32 and 33 are represented by three parallel lines. The center of the three parallel lines represents the axial corner of the 90 degree beam either concave or convex as shown. The outer two of the three parallel lines represents the open flange edges of the 90 degree beam. The 90 degree beams in FIG. 2 and FIG. 3 are represented by two parallel lines. These two parallel lines represent one open flange edge and the beam axial corner as viewed. Drive train frame 17 corner joints are made by overlapping one open flange end of one beam with one open flange end of an adjoining perpendicular beam. In FIG. 2 beam 2 overlaps the ends of both perpendicular beams 26 and 27 above and below lower rotor bearing 23 respectively.

In FIG. 1 drive train frame 17 beams 1, 1B, 2, 2A, 26, 27, 28, 31, 32, 33, 34 and 35 form a three dimensional rectangular box. These drive train frame 17 beams convex axial corners all point away from the center of this three dimensional box. Most drive train frame 17 beam joints are welded. Additional beams in FIG. 1 are welded to both beams 2 and 2A to support lower rotor bearing 23 (see FIG. 2) and lower rotor blade hub 21. Additional beams will be bolted to the drive train frame 17. These bolted beams can be slotted, blocked or shimmed to support and align the gearbox 37 low speed shaft with the rotor shaft 5 longitudinal axis and rotor bearing spindles (see reference 46 of FIG. 5).

In FIG. 1 both beams 1 and 1B are part of the drive train frame and along with beam 1A also form the erection gin pole frame. Noting beam 1 in FIG. 2 and beam 1A in FIG. 3 the erection gin pole frame is also visualized. This erection gin pole frame has erection cable guide cup 20 attached in FIG. 1, FIG. 2 and FIG. 3. Guy cable 7 is attached to upper rotor bearing assembly 6 through cable clamp hole 7B. Guy cable 7 is also temporarily clamped to temporary erection cable 7A by clamp 10A. The loose end of guy cable 7 is not shown in any figure. Erection cable 7A is also attached to be wound onto the drum of cable winch 15 as shown in FIGS. 1,2 and 3. The erection gin pole formed by beams 1, 1A and 1B lifts cables 7 and 7A to form an erection angle with the turbine rotor shaft 5 longitudinal axis. This erection angle reduces the tension in cables 7 and 7A during turbine assembly and pivot erection. Cables 7 and 7A form the complete erection cable to pivot the turbine assembly 25

(except central support structure anchor assembly 16) into a vertical position. Cable 7A is connected between guy cable 7 and the cable winch 15 so cable 7 is not permanently bent over beams 1A or 32.

FIG. 1 shows drive train frame beams 2 and 2A are welded to 90 degree two flange beam 3. Comparing FIG. 2 and FIG. 3 also shows beam 3 welded to beams 2 and 2A. FIG. 1, or 2 and 3 combined, show beams 2 and 2A attached to the drive train frame 17. The ends of beams 2, 2A and the length of one beam 3 flange rest upon the ground plane. FIG. 2 has a cut away view below the ground plane. Soil is represented by several groups of three short parallel alternating angle lines below the ground plane.

FIG. 1 and FIG. 3 show guide notches 3B and 3A in the ends of beam 3 to hold cables 8A and 9A respectively. Guy cable 8 is attached to upper rotor bearing assembly 6 through cable clamp hole 8B. Cable 8 is also attached to cable 8A by cable clamp 10B. Cable 8A is also attached to drive train frame 17 through turnbuckle 11 and cable clamp hole 8C. Cable 8A is strung over one end of stabilizing gin pole 3 through guide notch 3B. Guy cable 9 is attached to upper rotor bearing assembly 6 through cable clamp hole 9B. Cable 9 is also attached to cable 9A by cable clamp 10C. Cable 9A is also attached to drive train frame 17 through turnbuckle 12 cable clamp hole 9C. Cable 9A is strung over the other end of stabilizing gin pole 3 through guide notch 3A. Guide notch 3A eliminates any noticeable change in position of combination cable 9, 9A while in tension. Guide notch 3B eliminates any noticeable change in position of combination cable 8, 8A. Cables 8A and 9A are used to prevent permanently bending guy cables 8 and 9 over the ends of gin pole 3.

Stabilizing gin pole 3 and beams 2 and 2A form a combined hold down and stabilizing gin pole frame causing guy cables 8 and 9 to form equal hold down angles with the longitudinal axis of rotor shaft 5. These hold down angles reduce tension in hold down and stabilizing combination cables 8, 8A and 9, 9A during turbine assembly and pivot erection.

The hold down angles formed by cable combinations 8, 8A and 9, 9A can be broken down into angle components. These hold down angle components can be seen by alternating between FIG. 2 and FIG. 3. A hold down plane exists that is perpendicular to the ground plane shown in FIG. 2. FIG. 2 has a cut away view below the ground plane. Soil is represented by several groups of three short parallel alternating angle lines. This hold down plane also contains the longitudinal axis of both rotor shaft 5 (not shown) and drive train frame 17 (not shown). The hold down plane also contains erection cable combination 7, 7A which is best visualized in FIG. 3. Erection guide cup 20 holds combination cable 7, 7A in the hold down plane.

A stabilizing plane also exists. This stabilizing plane is perpendicular to the hold down plane just described. This stabilizing plane also contains the longitudinal axes of rotor shaft 5 and drive train frame 17. The stabilizing plane is also parallel to the ground plane. This parallelism is best visualized in FIG. 2.

FIG. 2 shows that combination cable 9, 9A makes an acute angle with the longitudinal axis of rotor shaft 5. FIG. 2 best helps visualize how the cable 9, 9A acute angle with the rotor shaft 5 longitudinal axis can be projected onto the hold down plane. A similar rotor shaft 5 longitudinal axis acute angle projection on to the hold down plane for cable combination 8, 8A can also be visualized in FIG. 2. FIG. 3 shows that combination cables 8, 8A and 9, 9A also make acute angles with the longitudinal axis (not shown) of rotor shaft 5. FIG. 3 best helps visualize how the cables 8, 8A and 9, 9A acute angles with rotor shaft 5 longitudinal axis can be projected onto the stabilizing plane. These projected angle lines can also be recognized as tension vectors in the cable combinations 8, 8A and 9, 9A projected onto the hold down and stabilizing planes mentioned.

It can be seen in FIG. 3 that the tension vectors of cables 8, 8A and 9, 9A projected onto the stabilizing plane tend to be equal. These cable tension vectors tend to be equal because their angles with the rotor shaft 5 longitudinal axis are equal. It can be seen in FIG. 2 that the tension vectors of cables 8, 8A and 9, 9A projected onto the hold down plane tend to be equal. These cable tension vectors tend to be equal because their angles with the rotor shaft 5 longitudinal axis are equal. The tension vector angles that cables 8 and 9 make with rotor shaft 5 longitudinal axis are made equal through adjustment of turnbuckles 11 and 12 respectively.

There are two purposes for combination cables 8, 8A and 9, 9A. The first purpose is to hold together the stacked assembly, of frame 17 and rotor shaft 5 and upper bearing assembly 6, in combination with cable 7, 7A. The second purpose is to hold, the shaft 5 longitudinal axis in parallel with the central longitudinal axis of the frame 17 rectangular box, in both the hold down and the stabilizing planes during pivot erection. Longitudinal axis alignment in the stabilizing plane is obtained because the stabilizing plane tension vectors of cables 8 and 9 are equal and in opposite directions. Longitudinal axis alignment in the hold down plane is obtained because the hold down tension vectors of cables 8 and 9 are opposite to the tension vector in cable 7 and because the stacked assembly of frame 17 and rotor shaft 5 and upper bearing assembly 6 will rotate around pin 14.

Figure 5:
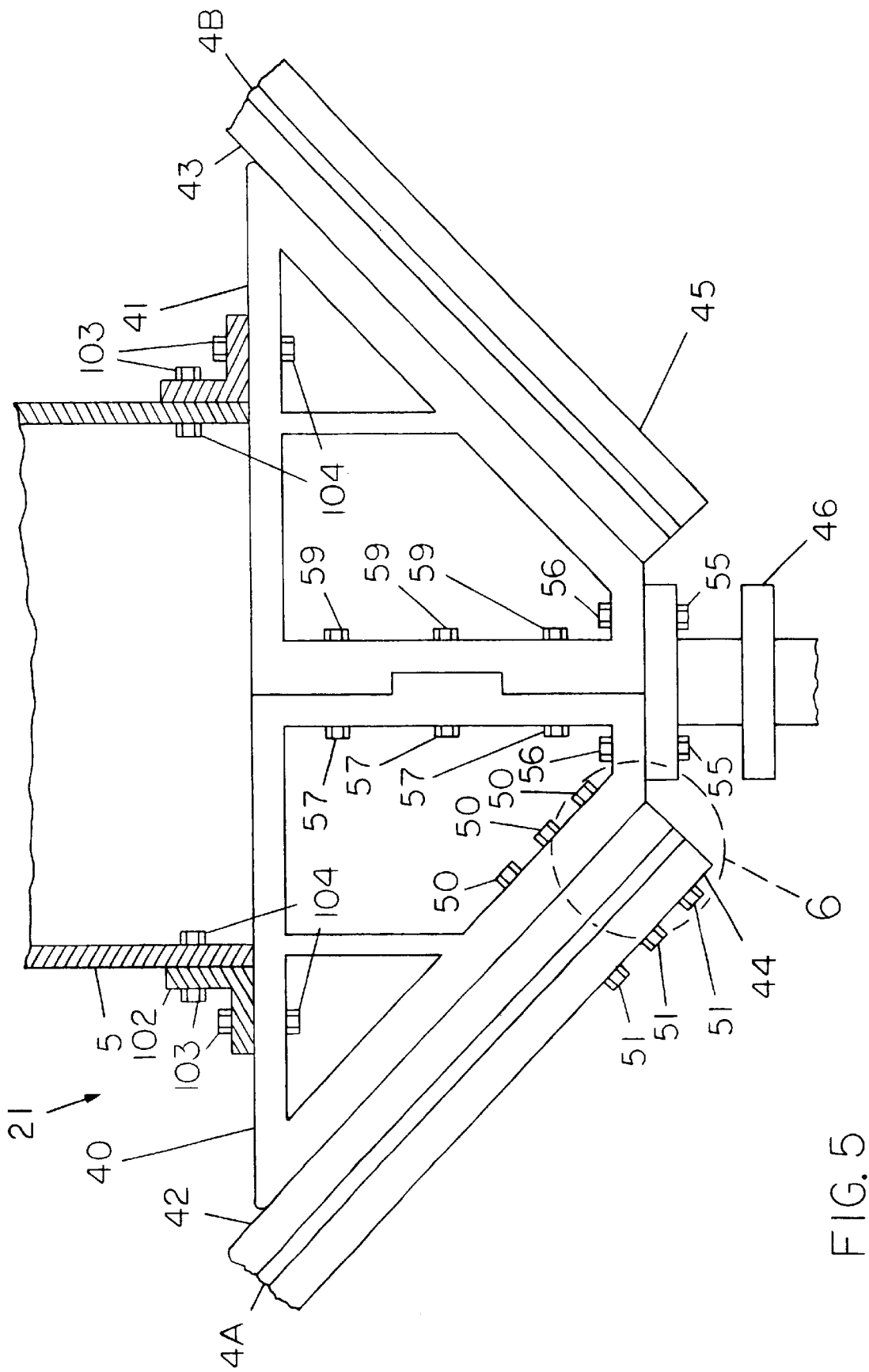
FIG. 5 A detailed expanded top view from a dashed circle section in FIG. 3.

During turbine assembly, the rotor shaft 5 is raised a few feet by an inexpensive hydraulic crane. A gantry frame with a chain hoisting gear block could also be used. The rotor shaft 5 is raised midway along the length to maintain it parallel to the ground, using a wide cloth belt. The rotor lower bearing spindle 46 is then mounted through the lower rotor bearing 23. The rotor lower bearing spindle 46 is shown in FIG. 5.

The rotor lower bearing spindle 46 is a right circular cylinder whose circular central axis aligns with the longitudinal axis of rotor shaft 5. The rotor lower bearing spindle 46 has a circular flange that transmits down forces to the rotor lower bearing during turbine operation The hydraulic crane continues to support the rotor shaft 5. The upper rotor bearing 24 and the rotor upper bearing assembly 6 are then fitted to the upper rotor bearing spindle 47 (seen in FIG. 1). The slack in cable combinations 8, 8A and 9, 9A are removed using clamps 10B, 10C respectively.

The rotor shaft 5 is still supported by the hydraulic crane. Now erection cable combination 7, 7A slack is removed by winding cable winch 15. Tension in the three cable combinations is increased slowly using winch 15 and turnbuckles 11 and 12. These cable tensions are increased incremental to maintain axial alignment between the rotor shaft 5 and the drive train frame 17 as seen in FIGS. 2 and 3. These incremental cable tension increases also keep the upper rotor bearing assembly 6 major axis perpendicular to the rotor shaft 5 longitudinal axis. The hydraulic crane can now release the rotor shaft 5. Cable combination 7 and 7A will now support rotor shaft 5 in position shown. Rotor blades 4A and 4B can now be mounted to rotor blade hubs 21 and 22.

An overlapping stacked assembly now exists. This overlapping stacked assembly consists of the central support structure (drive train frame 17) supporting the lower end of rotor shaft 5 through the lower rotor blade hub 21 the rotor lower bearing spindle 46 and the lower rotor bearing 23. The stacked assembly also includes the upper rotor bearing assembly 6 supporting the upper end of rotor shaft 5 through the upper rotor blade hub 22 the upper rotor bearing spindle 47 and the upper rotor bearing 24. The lower rotor bearing 23 is mounted to the upper end of drive train frame 17 as shown in FIG. 2 and FIG. 3. The rotor lower bearing spindle 46 is attached to the lower rotor blade hub 21 and is mounted into bearing 23 during assembly The upper rotor bearing is mounted to upper rotor bearing assembly 6 as shown in FIG. 2 and FIG. 3. The upper rotor bearing spindle 47 can be seen in FIG. 1. The upper rotor bearing spindle 47 is attached to the upper rotor blade hub 22 and is mounted into bearing 24 during assembly. The lower and upper rotor bearing spindles are attached so that their central axes align with the longitudinal axis of rotor shaft 5 as seen by comparing FIG. 5 with FIG. 1.

Note FIGS. 1 and 3 show drive train frame 17 connected to both vertical metal columns 16A and 16B through erection pivot pin 14. In FIG. 2 columns 16A and 16B are welded to metal beam 16D. FIG. 2 also shows beam 16D welded to metal beam 16C and column 16A. Another metal beam (not shown) parallel to beam 16C is welded to both column 16B and beam 16D and is fully embedded in concrete slab 18. Columns 16A and 16B are partially embedded in concrete slab 18. Beams 16C and 16D are fully embedded in concrete slab 18. Concrete slab 18 is also embedded in the ground. The central support structure anchor assembly 16 consists of columns 16A, 16B and beams 16C, 16D (and the beam parallel to 16C not shown) and concrete slab 18. Note that concrete slab 18 lies in a shallow hole below the ground plane. Note that anchor beams 16C and 16D must be shimmed, before the concrete of slab 18 is poured. Beams 16C and 16D are shimmed so that pivot pin 14 is parallel, and 16A and 16B are perpendicular to the ground plane. Erection cable winch 15 is mounted to concrete slab 18.

The stacked assembly is held together by erection cable combination 7, 7A and hold down cable combinations 8, 8A and 9, 9A. Tension in erection cable combination 7, 7A is maintained because the stacked assembly is connected to the central support structure anchor assembly 16 by erection pivot pin 14. Pin 14 and the ground embedded support anchor assembly 16 do not allow the stacked assembly to slide across the ground when tension increases in cable combination 7, 7A. As cable winch 15 winds in cable 7A the stacked assembly rotates about pivot pin 14 thus initiating pivot erection.

Pivot erection of the stacked assembly must be done slowly with incremental movements of cable 7A. Careful attention must be paid maintain to the alignment of the longitudinal axis of rotor shaft 5 with the longitudinal axis of frame 17. Incremental tightening or loosening of combination cables 8, 8A or 9, 9A may be needed. Tension adjustment in cables 8, 8A or 9, 9A can only be done when cable 7A is motionless. Tension adjustment of cables 8, 8A or 9, 9A, during pivot erection, can only be done with turnbuckles 11 and 12 respectively.

Note in FIG. 2 that the pivot erection rotation of the stacked assembly to vertical is approximately 90 degrees. Pivot erection must be halted, before the last 40 degrees of rotation is obtained. This final 40 degree rotation halt is needed to avoid loss of tension in cable 7A. Tension loss in cable 7A will occur because of the movement of the stacked assembly mass center during pivot erection. Note in FIG. 2 that most of the electric motor generator 36 and speed reducer gearbox 37 weight is located between beams 29 and 2 and 27 and 26. The center of mass for the stacked assembly is near the lower rotor blade hub 21. Now the hydraulic crane must be positioned near frame 17 beam 31. A wide cloth web lift strap must be loosely fitted between the hydraulic crane arm and frame 17 beam 31. The crane lift arm can now be raised to remove lift strap slack. The lift strap should now stop stack rotation, if cable 7A tension is lost. Now cable 7A can be shortened incrementally after lowering the crane lift arm one inch at a time. Uncontrolled rotation of the stacked assembly must be avoided.

Note in FIG. 2 that the motor generator 36 shaft is coupled to the high speed shaft of speed reducer gearbox 37 by a chain and two sprocket assembly 105. Also in FIG. 2 flexible shaft coupling 39 connects gearbox 37 low speed shaft with the lower rotor bearing spindle 46.

FIG. 1 shows both drive train frame 17 offset connector beams 29 and 30. Offset connector beams 29 and 30 are 90 degree two flange beams welded to drive train frame 17 beams 27 and 28 respectively. Offset connector beams 29 and 30 are also connected to columns 16A and 16B respectively by erection pivot pin 14. Beams 29 and 30 and columns 16A and 16B and erection pivot pin 14 form an erection hinge for the stacked assembly. Beams 29 and 30 separate frame 17 beams 27, 28 from columns 16A and 16B to minimize any crushing action during frame 17 rotation around pin 14.

Figure 4:
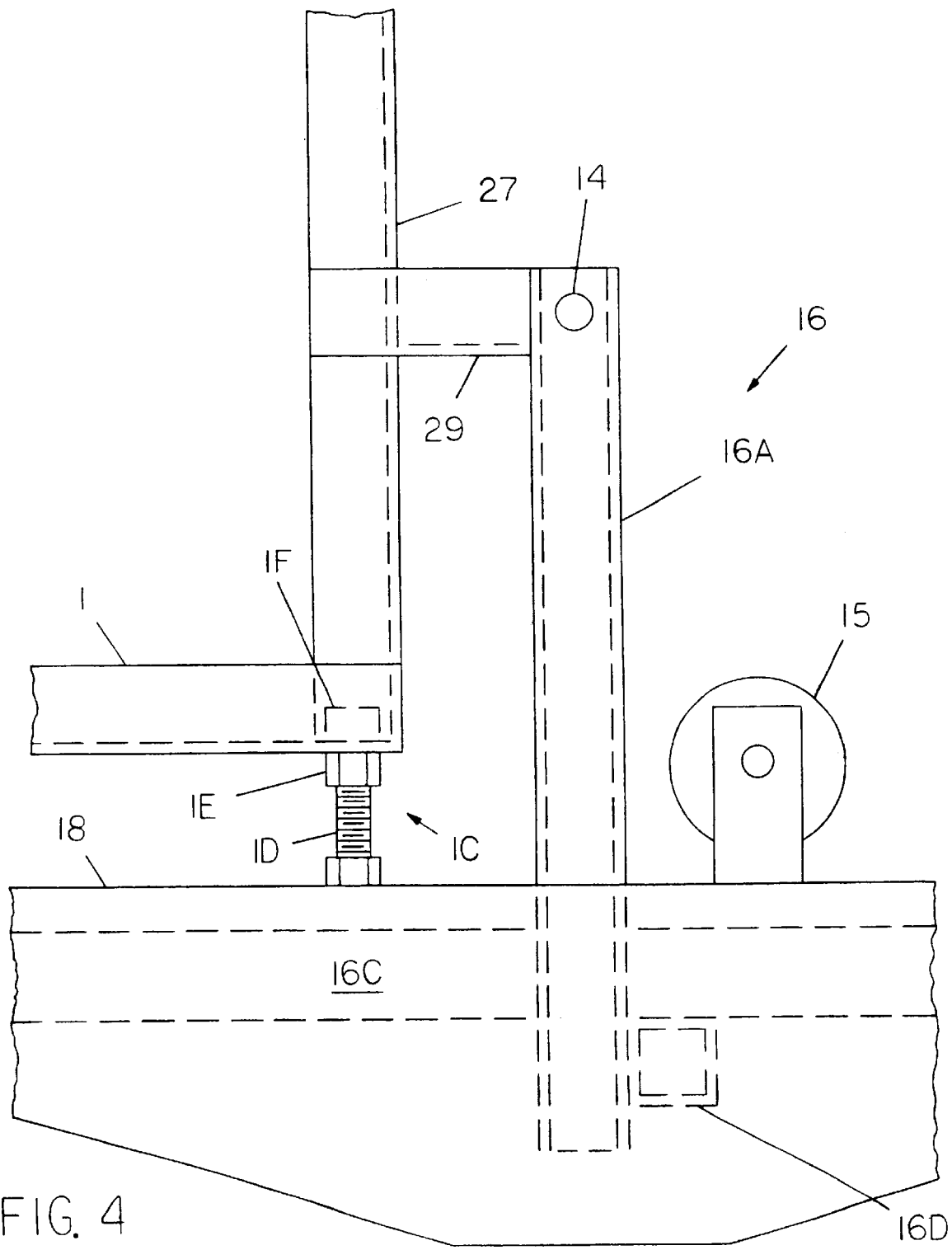
FIG. 4 A detailed expanded side view from a dashed circle section in FIG. 2.

FIGS. 2 and 4 show only offset connector beam 29. FIG. 4 is an expanded view of a dashed line circular section 4 of FIG. 2. FIG. 4 shows a side view of the central support structure anchor assembly 16 and cut-off sections of drive train frame 17. Compare FIG. 4 with FIG. 3. Note that only the thickness of one beam 29 flange separates beam 27 and column 16A in the top view. A portion of the beam 29 flange has been cut away to minimize the length of pin 14. This cut away flange allows for better welding contact between the concave face of beam 29 and the convex face of beam 27. This flange face overlap contact between beams 29 and 27 is best seen in FIG. 4. A similar flange portion of beam 30 has been cut away for better welding contact with beam 28. Beam 30 is shown best in FIG. 9.

FIG. 4 also shows more detail for the leveling and support assemblies 1C. Support assembly 1C consists of threaded hex bolt 1D and threaded hex nuts 1E and 1F. Support assemblies 1C greatly reduces or eliminates guy cable induced forces in central support structure anchor columns 16A and 16B and drive train frame offset connector beams 29 and 30. Four support nuts 1E are aligned and welded over passage holes in all four bottom corners of frame 17 as suggested by comparing FIGS. 2 through 4. FIGS. 2 and 3 show at least three 1C assemblies. Further comparison of FIGS. 2 through 4 also suggests that four support hex bolts 1D and four jam nuts 1F are also mounted to frame 17. FIG. 4 shows that bolt 1D is threaded through support nut 1E and passes through one of the two holes in beam 1. Jam nut 1F is threaded on to stud 1D. Nuts 1F are then threaded in to contact with frame 17 columns 1 or 1B. For jam nuts 1F to be effective, a wrench must be used to stop 1D from turning while, 1F is turned to jam. Note that the length of bolts 1D extending below frame 17 can be shortened to avoid concrete 18 contact during pivot erection. When frame 17 is in a vertical position, then all four bolts 1D can be adjusted to contact concrete 18, and support frame 17.

In FIG. 9 drive train frame 17 beam 27 longitudinal axis is perpendicular to the ground plane. This perpendicular beam 27 orientation is the turbine assembly 25 operating orientation. Guy cables 7, 8, and 9 attach upper bearing assembly 6 cable attachment holes 7B, 8B and 9B to three separate ground embedded cable anchor assemblies 90, 91 and 92 respectively. These upper bearing assembly 6 guy cable attachments can be seen by comparing FIGS. 1 and 10. These upper bearing assembly 6 guy cable anchors are uniformly spaced around the perpendicular rotor shaft 5 as seen in FIG. 10. The uniform spacing of these guy cable anchors allows each guy cable 7, 8, and 9 to make approximately a 35 degree angle with the ground plane. The ground plane includes the top surface of concrete slab 18 as shown in FIG. 2. These guy cable anchors are also uniformly laid out around a circle on the ground plane. The center of this cable anchor circle is where the longitudinal axis of frame 17 crosses the ground plane. The radius of the cable anchor circle is approximately 1.4 times the height of assembly 6 above the ground plane. This uniform cable anchor lay out allows for equal circular arc lengths between the centers of two adjacent cable anchors.

At least three lower rotor bearing guy cables must now be attached to frame 17 through cable attachment holes 70, 71 and 72. These drive train frame 17 cable attachment holes are seen in FIG. 9. Attachment hole 70 is attached to cable anchor assembly 78 by guy cable 75. Attachment hole 71 is attached to cable anchor assembly 77 by guy cable 74. Attachment hole 72 is attached to cable anchor assembly 76 by guy cable 73. These drive train frame 17 guy cable anchors will be uniformly spaced around the rotor lower bearing 23. The uniform spacing between the lower rotor bearing guy cable anchors will allow each guy cable to make approximately a 35 degree angle with the ground plane. These cable anchors are also uniformly laid out around a circle on the ground plane. The center of this cable anchor circle is approximately where the shaft 5 longitudinal axis intersects the ground plane. This uniform cable anchor lay out allows for equal circular arc lengths between the centers of two adjacent cable anchors as seen in FIG. 10. The radius of the drive train frame cable anchor layout circle is approximately 1.4 times the height of the lower bearing 23 above the ground plane.

When the turbine assembly 25 is in the erected position, the rotor shaft 5 longitudinal axis is perpendicular to the ground plane. When the turbine assembly 25 is installed, both the upper and lower rotor bearing guy cable groups are in tension. All the guy cables form approximately a 35 degree angle with the ground plane. Each guy cable transmits a large vertical tension component. These large vertical cable tension forces are supported by the four support assemblies 1C. Guy cables 7, 8 and 9, when tightened, hold upper bearing assembly 6 and the upper end of rotor shaft 5 in a rigid vertical position. Guy cables 73, 74 and 75, when tightened, hold frame 17 beams 26, 27, 28 and 35 in a rigid vertical position.

Figure 11:
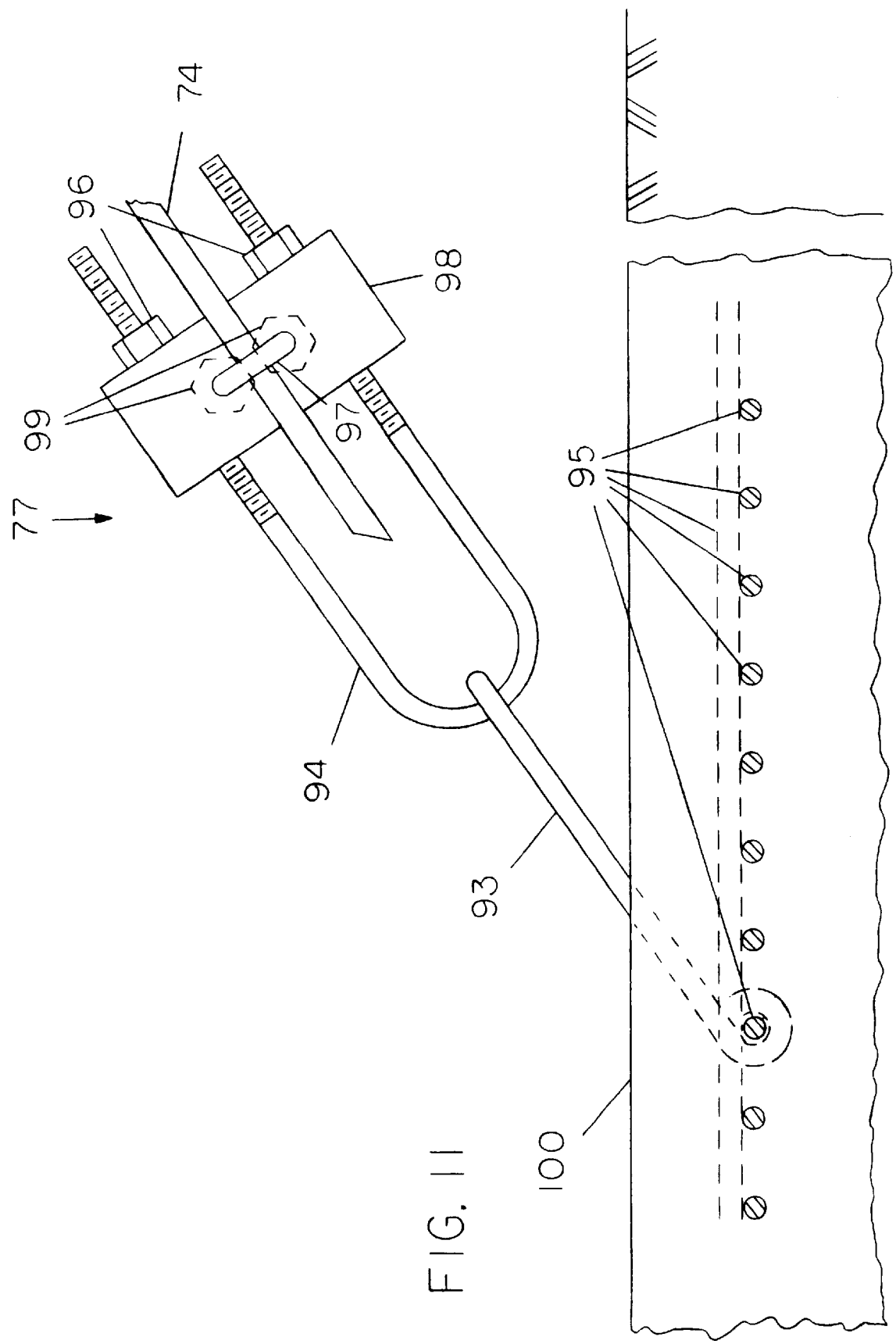
FIG. 11 A detailed side view of a drive train frame guy cable anchor, anchor concrete footings and guy cable.

FIG. 11 shows a detailed side view of cable anchor assembly 77. All other guy cable anchor assemblies 76, 78, 90, 91 and 92 are constructed similar to assembly 77. Anchor assembly 77 consists of double loop end anchor rod 93, concrete slab 100, concrete reinforcing rods 95, u-bolt 94, clamp bolt 97, tension nuts 96, and clamp nuts 99. Anchor 93 has a closed loop at both ends. One anchor 93 loop holds u-bolt 94. The other anchor 93 loop is embedded in slab 100 while holding a reinforcing rod 95. Bolt 97 and nuts 99 clamp one end of cable 74 to slide block 98. Tension nuts 96 are set to pull cable 74 in tension to footing 100. All anchors are ground embedded.

FIG. 3 shows a dashed circle marked by a dashed lead line to large number 5. FIG. 5 is an enlarged view of the dashed circular section marked 5 in FIG. 3. Blade hub assembly 21 consists of hub halves 40 and 41 threaded hex bolts 57 and threaded hex nuts 59. Hub halves 40 and 41 are cut from the same hollow extruded aluminum alloy beam. The edges of the outside faces of hub half 40 or 41 form a right trapezoid. This right trapezoid cross section of hub half 40 or 41 is seen in FIG. 5, by ignoring the rectangular key at their bolt joint. A right trapezoid is a four sided figure where three of the four sides form two 90 degree angles. A trapezoid is a four sided figure where only two of the sides are parallel. The outside face between the right angles of hub 40 has had aluminum cut away to form a male rectangular key. This male rectangular key extends into the page of FIG 5 at a 90 degree angle to the page surface for the entire length of hub 40. Note that a matching rectangular key slot has been cut along the entire length of hub 41. Note hub 41 internal web.

Note that the cross section of assembly 21 forms an isosceles trapezoid, An isosceles trapezoid is where the two non-parallel sides are of equal length. The angles at the ends of each parallel side are equal in an isosceles trapezoid. The angles of an isosceles trapezoid are never 90 degrees. Note that the longer parallel side of isosceles trapezoid 21 is approximately 53 inches long. Blade hub 21 is intended for use in the 10 HP. and 25 HP. rated turbines.

FIG. 5 also shows a cross sectional view of a two flange ring bracket 102 and the lower end rotor shaft 5. Note that the two flanges of ring bracket 102 has hatch lines. Ring bracket 102 is a cast aluminum alloy piece. This 90 degree two flange circular ring bracket 102 inside diameter is slightly larger than the outside diameter of the right circular cylindrical shaft 5. Ring bracket 102 attaches shaft 5 to hub halves 40 and 41 with many threaded hex bolts 103 and many threaded hex nuts 104. Note that parts 42, 43, 44, 45, 4A and 4B in FIG. 5 are attached with threaded hex bolts 50 and threaded hex nuts 51 to hub 21. Threaded hex bolts 56 and threaded hex nuts 55 attach rotor bearing spindle 46 to hub assembly 21.

There are at least three significant advantages for blade hub 21. No welding is required; to form hub 21, to attach 21 to 5, or to attach 42, 43, 44, 45, 4A, 4B or 46 to 21. This elimination of welding significantly reduces human manufacturing health issues and costs. A single aluminum alloy extrusion can be cut into many rough hub halves, which is cost effective. Aluminum is highly corrosion resistant.

In FIG. 5 lower bearing spindle 46 is not completely shown. The cut off of spindle 46 is seen by the short jagged line shown at the bottom center of FIG. 5. Bearing spindles 46 and 47 are composite right circular cylinders, each cut from one continuous metal piece. The larger composite circular diameter cylinders create either a bolting flange or a bearing contact flange as seen in FIG. 5. The smaller diameter cylindrical end of spindle 46, that is cut off, is the end coupled to gearbox 37 by coupling 39 in FIG. 2.

FIG. 5 has a dashed circle marked by a dashed lead line to large numeral 6. FIG. 6 shows an enlarged and rotated view of the area inside the dashed circle 6 of FIG. 5. Dashed circle 6 shows a side edge view of the left rotor blade 4A, blade clamp blocks 42, 44 and the bolting web of hub half 40. This side edge view of circle six has been rotated 90 degrees around the trapezoid non-parallel line that is the bolting web corner edge of blade hub 40 in FIG. 6. FIG. 6 shows the outside face and the outside end corner of blade clamp 44. FIG. 6 shows the broken out bottom portion of the clamp block 44 outside face and adjacent broken out web face of hub half 40. The long straight line represents both the outside bottom corner of clamp block 44 and the bottom left outside corner of hub half 40. The jagged line roughly parallel to the line representing the bottom outside corner edge of block 44, shows this breakout. The two short jagged lines of FIG. 6 shows the break out of hub half 40 bolting web face. FIG. 6 shows the entire width of blade clamping block 44. FIG. 6 shows the elongated bolt holes through clamp block 44. These elongated bolt holes are also referred to as slotted holes.

FIG. 7 is a cross sectional view of FIG. 6. This cross sectional view is of a plane that runs through the bottom faces of the heads of clamp bolts 50 in FIG. 6. This cross sectional view shows an expanded view of the bolting web thickness of hub half 40. This hub 40 bolting web central axis (not shown) makes an approximate 47 degree angle with rotor shaft 5 longitudinal axis (not shown) and is best visualized in FIG. 5.

In FIG. 7, note the short jagged lines for the hub 40 bolting web, indicates that this web is broken out from the rest of the hub. Note also in FIG. 7 that the hub 40 bolting web is wider than clamp blocks 42 or 44. In FIG. 7 blocks 40, 42 and 44 and blade 4A have cross section hatch lines with uniform spacing and drawn at the same angle in each part. The spacing and angle of the hatch lines are different between adjacent parts. Note that the inside faces of blocks 42 and 44 have curved sections that match the curved outside faces of blade 4A. These curved face sections of clamp blocks 42 and 44 are what is meant by the term contoured. Blocks 42, 44, 43 and 45 are identical and have been cut from the same solid aluminum alloy extrusion.

In FIG. 7 the three center bolt 50 shanks are visible except through blade 4A. These exposed bolt shanks indicate bolt hole slotting in the hub bolting web and blocks 42 and 44. The bolt hole slots 52 of block 44, are more easily seen in FIG. 6. The FIG. 7 bolt slots of the hub bolting web and clamp block 42 are marked 54 and 53 respectively. In FIG. 7 the two bolts 50 mounted near both outside edges of blocks 42 and 44, have very little shank exposed. This FIG. 7 lack of outside bolt 50 shank exposure indicates no bolt hole slotting in web 40 and blocks 42 and 44. The lack of bolt hole slotting for the two outside bolts 50 in block 44, is more easily seen in FIG. 6. In FIG. 7 the outside clamp bolts 50 do not pass through blade 4A.

As seen in FIGS. 6 and 7, the clamp bolt hole slots are positioned in bolt web and blocks 42 and 44 only for bolts that pass through blade 4A. FIG. 7 shows the blade 4A clamp bolt holes to be unslotted. Bolting web and blocks 42 and 44 bolt slots allow for limited blade 4A movement. The lack of bolt hole slotting in blade 4A allows for less blade 4A movement. The lack of blade 4A clamp bolt hole slotting allows for stronger clamp bolt holes in blade 4A. Comparison between FIG. 3 and FIG. 5 best shows that, blade 4A moves in the clamp bolt slots 52, 53, and 54 along its major curved axis.

Contoured clamp blocks 43 and 45 use threaded hex bolts and threaded hex nuts (not shown) to clamp the lower end of blade 4B to the other non-parallel face of hub assembly 21. Contoured blade clamping blocks, similar to 42 and 44, are bolted to both the non-parallel outside faces of hub assembly 22. These contoured clamp blocks hold the upper ends of blades 4A and 4B to the upper end of rotor shaft 5 as seen in FIG. 3.

The bolt hole size and spacing for the slotted and unslotted clamp bolt holes are identical, for all four sets of blade clamp blocks and all four hub non-parallel faces, as described for blocks 42 and 44. The non-slotted bolt holes in every blade end are spaced to align with the slotted bolt holes of all clamp blocks. There are three rows with five bolts 50 and nuts 51 shown in FIG. 5. A total of seven rows of bolt holes will be used to mount blocks 42 and 44. Hole layout in each row is as shown in FIG. 6.

Blades 4A and 4B have a curved aerodynamic external cross section which converts wind energy to mechanical energy, by rotation of shaft 5 with torque through the blade hubs.

The slotted bolt holes 52, 53, and 54 allow for blade movement due to blade modal vibration driven by rotor rotation. These blade vibrations are described in several Sandia Laboratories reports including (SAND90-1615) "INITIAL STRUCTURAL RESPONSE MEASUREMENTS FOR THE SANDIA 34-METER VAWT TEST BED". This blade movement in the mounting bolt slots reduces the peak stresses in the rotor blades, blade hub assemblies 21 and 22 and rotor shaft 5 due to vibration. These blade mounting slots also provide a final stop for blade end movement in case of rotor overspeed.

Figure 8:
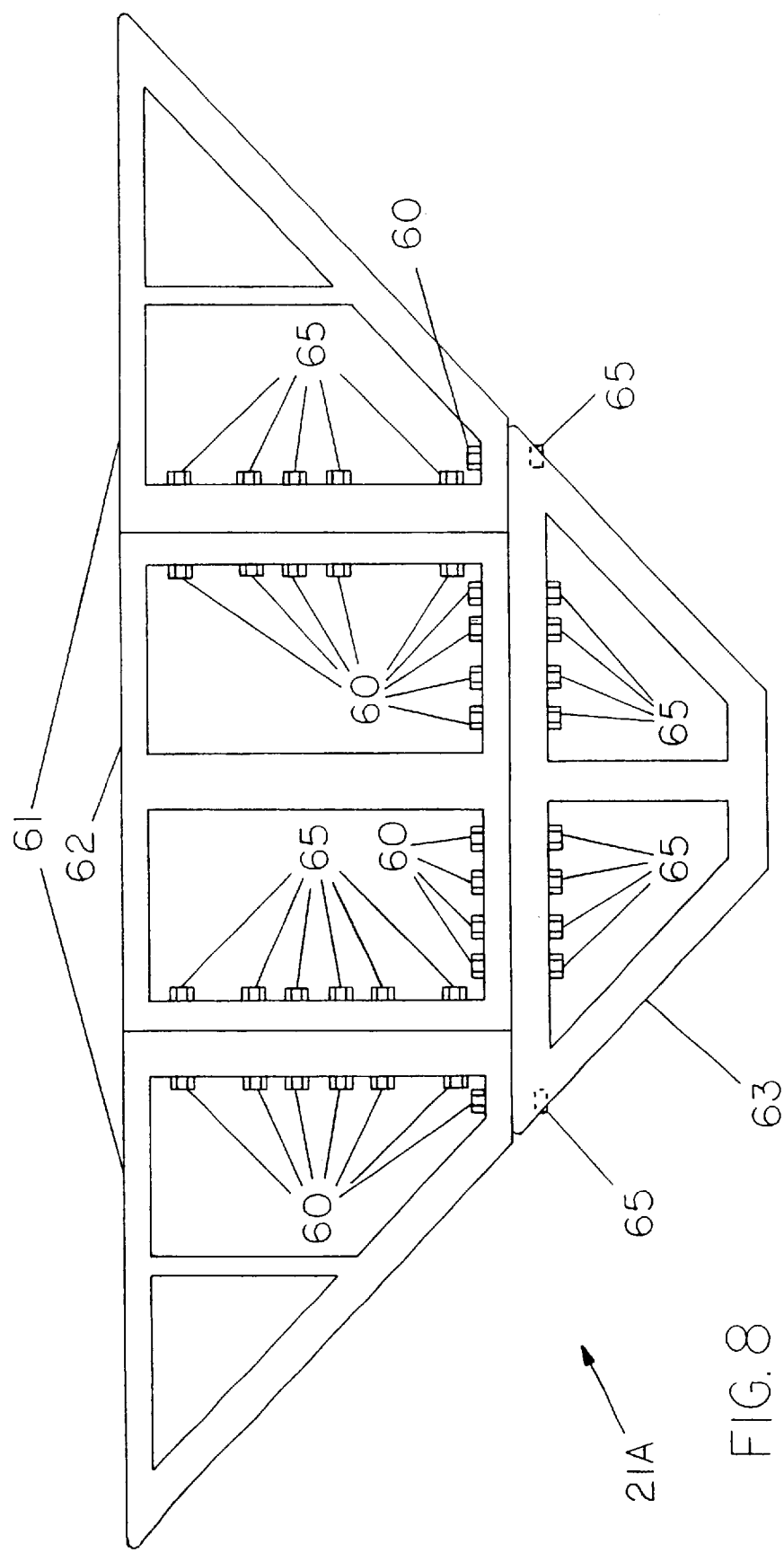
FIG. 8 A detailed side view of a larger four beam blade hub assembly.

The Sandia 34-meter vertical axis wind turbine design shows contoured blade clamps. These Sandia 34-meter blade contoured clamps do not appear to have bolts that pass through both the clamps and the blades. This lack of through blade clamp bolts is best seen in FIG. 5.13 of Sandia Laboratories report (SAND91-2228) "MEASURED DATA FOR THE SANDIA 34-METER VERTICAL AXIS WIND TURBINE". Note that only one row of bolts and nuts can be seen in the side edge view of the blade hub clamp number 13. This absence of through the blade clamp bolts is further seen in the design sketches in Sandia Laboratories report (SAND-84-1287) "STRUCTURAL DESIGN OF THE SANDIA 34-METER VERTICAL-AXIS WIND TURBINE". FIG. 8 of report SAND-84-1287 is entitled "Blade-to-Tower Joint and Clamp". A cross-sectional view (SECTION A—A) of this FIG. 8 suggests two rows of blade clamp bolts none of which pass through the blade. Through the blade clamp bolts with slotted holes in the blade clamps and the blade hub bolting web is a new safety and anti-fatique feature.

Sandia Laboratories publication number SAND90-1615 includes a report entitled INITIAL STRUCTURAL RESPONSE MEASUREMENTS FOR THE SANDIA 34-METER VAWT TEST BED". This structural measurements report shows rotor modal vibration shapes in FIG. 5. This structural measurements report also shows a rotor resonance fan plot in FIG. 7. Note that the change in resonant frequency for the rotor tower (shaft) in plane line and the blade second flatwise antisymmetrical line seem to be reflections of each other with increasing rpm. This resonance frequency divergence between 1TI and 2FA and the similarity of blade shapes between modes 5 and 7, suggests a physical connection. The physical connection appears to be that the less stress produced by the antisymmetrical blade shape the less in plane deformation of the rotor tower (shaft). The less the in plane tower (shaft) deformation the higher the resonant frequency of the tower in-plane line with change in rotor rpm. The higher the tower in-plane resonance frequency line, the higher the operating rotor rotational speed without damaging rotor resonant vibration stress. The use of slotted blade clamps and blade hub mounting holes allows flat-wise blade modal deformation without transmitting extra modal stress to the rotor shaft.

Note in FIG. 7 that blade clamp blocks 42 and 44 have contoured faces that match the outside curve of blade 4A. Note these contoured clamp faces better distribute the clamping stress throughout the blade cross section.

FIG. 8 shows a side view of a larger blade hub assembly 21A. FIG. 8 shows the open ends of four hollow extruded aluminum alloy beams that extend several inches into the page per scale. Hub assembly 21A consists of two right angle trapezoids 61 rectangle 62 and isosceles trapezoid 63. Right angle trapezoids 61 are the same as right trapezoids 40 and 41 minus the matching keyways. Hub assembly 21A is also an isosceles trapezoid. The non-parallel sides of trapezoid 21A represent the side edges of the blade clamp web faces. The four hollow aluminum beams of assembly 21A are joined by many rows of threaded hex bolts 60 and threaded hex nuts 65 as shown in FIG. 8. All bolts described 50, 56, 57, 60 and 103 will have a cross hole near end of threads for cotter pin installation. All hex nuts described 51, 55, 57, 65 and 104 will have slots in end to fit cotter pin installation.

Hub assembly 21A is approximately 50 percent larger than assembly 21 of FIG. 5. The additional hollow beams 62 and 63 are generally needed if beams 61 are the largest aluminum alloy extrusions available. For a 36 inch diameter extrusion press the long parallel side of trapezoid 61 cannot exceed 26.5 inches. This dimension limit is true because the blade axis makes a 47 degree angle with the rotor shaft 5 longitudinal axis. This blade longitudinal axis to rotor shaft longitudinal axis angle is common for VAWTs with troposkein shaped blades and a rotor shaft length over blade major diameter ratio of 1.5. In addition to the 47 degree angle the short parallel side length also limits the length of the long parallel side.

The non-parallel sides of trapezoid 63 extend the amount of supported contoured blade clamp length. The length of supported contoured blade clamp blocks is the length of either non-parallel side of isosceles trapezoid 21A. A longer supported contoured blade clamp block length will support a longer and or wider rotor blade. The length of one non-parallel side of isosceles trapezoid 21A is approximately 48 inches. Blade hub 21A is sized to be used in the 50 HP. and 75 HP. peak rated turbines.

The contoured blade clamp blocks mounted to hub assembly 21A will have the same cross section as clamp blocks 42 and 44. These assembly 21A contoured blade clamp blocks will be cut from the same aluminum alloy extrusion as blocks 42 and 44. Hub 21A clamp blocks will be cut to a greater length. Hub 21A and hub 21A blade clamp blocks will be machined with rows of 5 clamp bolt holes similiar to hub 21. The not through the blade clamp block bolt holes in each row shall not be slotted for hub 21A. The bolt holes shall be located and shaped as shown in FIGS. 6 and 7.

The 75 HP. peak rated turbine will use four blade hub isosceles trapezoids similar to hub 21A. Each end of rotor shaft 5 would have two 21A hub stacked between it and the respective rotor bearing. Note the center interior extruded webs of both hollow beams 62 and 63. A symmetric plane can be imagined passing through the center of the interior webs of both hollow beams 62 and 63. This symmetric plane divides isosceles trapezoid beam 63 into two right trapezoids. This same symmetrical plane divides square hollow beam 62 into two rectangles. The two stacked blade hubs would have their symmetrical planes intersect at a 90 degree angle to each other. This 75 HP. turbine blade alignment would cause the center longitudinal axes of the four blades to be 90 degrees apart with respect to the rotor shaft 5 longitudinal axis.

This 90 degree separation is imagined in a circular plane section containing all four rotor blades. This circular plane section would be perpendicular to the rotor shaft 5 longitudinal axis. This circular plane section would also have the rotor shaft 5 longitudinal axis as the circular center. This circular plane section, in which the four blade centers are essentially 90 degrees apart, is best visualized in FIG. 10.

The 75 HP. peak rated turbine would therefore have four blades and a higher rotor solidity. Rotor solidity is a ratio of surface areas. This solidity area ratio is the blade area divided by wind face area of the rotor. Rotor solidity is described in "The Wind Power Book" by Jack Park page 96. The blade area is the length of the rotor blades multiplied by the chord length of blades. This assumes that the blades have the same chord length for the entire blade length. An average chord length can also be used. The wind face of the rotor is an oval plane section. This oval plane section contains the longitudinal axis of rotor shaft 5 and is bounded by the curved longitudinal axes of two opposite blades. This rotor wind face area is easily seen in FIG. 3.

A higher rotor solidity generally raises the wind energy conversion efficiency of the vertical axis wind turbine (VAWT) rotor. Sandia Laboratories report number SAND78-0014 entitled "FOUR AERODYNAMIC PREDICTION SCHEMES FOR VERTICAL-AXIS WIND TURBINES: A COMPENDIUM" FIGS. 1 and 2 show shows how higher solidity gives higher efficiency in a VAWT. A four blade VAWT rotor also has reduced torque ripple, which also improves rotor efficiency. The four blade 75 HP. peak rated turbine rotor dimensions would not be much greater than the two blade 50 HP. rotor.

Note in FIG. 1 that upper bearing assembly 6 is a rectangular frame composed of 90 degree two flange beams. The basic assembly 6 frame is composed of two flange beams 6A, 6B, 6C and 6D.

The rotor dimensions for a VAWT are rotor shaft 5 length and the major blade diameter. The major blade diameter runs between the points of greatest curvature at blade length center. The blade major diameter intersects the rotor shaft 5 longitudinal axis and is perpendicular to that axis. The major blade diameter is easily visualized in FIG. 3. The 10 HP. turbine rotor dimensions are approximately; rotor shaft 5 length 24 feet, blade major diameter 16 feet. The 25 HP. turbine rotor dimensions are approximately; rotor shaft 5 length 37 feet, blade major diameter 25 feet. The 50 HP. turbine rotor dimensions are approximately; rotor shaft 5 length 54 feet, blade major diameter 36 feet. The 75 HP. turbine rotor dimensions are approximately; rotor shaft 5 length 46 feet, blade major diameter 40 feet. Note the height of two stacked four beam blade hubs is approximately 6.5 feet.

Another important dimension is the hollow shaft 5 outside diameter. The rotor shaft 5 will be a right cylindrical hollow pipe extruded from aluminum alloy. The 10 HP. hollow rotor shaft outside diameter is approximately 14 inches with a wall thickness of approximately 0.25 inches. The 25 HP. hollow rotor shaft outside diameter is approximately 20 inches with a wall thickness of 0.5 inches. The 50 HP. hollow rotor shaft outside diameter is approximately 24 inches with a wall thickness of 0.75 inches. The 75 HP. hollow rotor shaft outside diameter is approximately 24 inches with a wall thickness of 0.75 inches.

There are several important reasons to limit the turbine energy conversion rating to no more than 75 HP. The first reason is the ability to use one continuous blade length between the upper and lower blade hubs. The blade used on all four turbine rating would have the same symmetric cross section of hollow extruded aluminum alloy. The cross section chord length would be at least 16 inches. This same blade cross section would mean the need for only one aluminum extrusion die. The use of one blade extrusion die would limit extrusion and warehousing costs. The single blade cross section would mean only one solid extruded aluminum alloy blade contoured clamp block size would be needed for all four turbine ratings. Therefore only one blade clamp beam extrusion die is needed. The blade cross section shape would be a laminar flow shape similar to the NACA 6000 series.

The second reason to limit the turbine size is the use of single length hollow aluminum alloy pipe for the rotor shaft. A single rotor shaft length would reduce assembly costs. The 75 HP. rating limit would require single blade lengths of no more than 71 feet. This blade length could be shipped by truck with limited difficulty. Also only three different extruded hollow aluminum alloy beams are needed to fabricate the 75 HP. rotor blade hubs.

The third reason for a 75 HP. peak rating size limit is to limit the size and assembly weights of drive frame 17, speed reducer 37 and motor generator 36. Limiting these assembly weights practically guarantees the availability of standard short lift block and tackle or hydraulic cranes. The availability of short lift equipment avoids the cost of tall crane use. Generator 36 is used to generator electric power.

Note also that drive train frame 17 can be assembled as a factory module before shipment to an erection site. Beams 16A, 16B, 16C, 16D and parallel 16C can also be a factory assembled module for use in the support anchor 16. Factory assembled modules would be built under controlled conditions and therefore be more cost effective.

It is seen an improved Darrieus-type vertical axis wind turbine is herein illustrated and described which can be fabricated at the factory in modules or shipped as single extrusions. The turbine has a improved non-welded blade clamps and blade hub assemblies. These blade clamps and hubs are frabricated with slotted blade bolt mounting holes. These slotted mounting holes reduces modal vibration resonance.

The invention also provides an erection hinge used, with an erection gin pole and combination hold down and stabilizing gin pole, to pivot erect the stacked assembly from a horizontal to a vertical position. This pivot erection is accomplished using three guy cables in tension attached to the rotor upper bearing assembly. One of the three erection cables is pulled by a turbine anchor mounted winch over the erection gin pole to pivot the stacked assembly from a horizontal to a vertical position.

Although a preferred embodiment of the invention has been selected for illustration and description, it will be apparent that numerous modifications can be made therein without departing from the invention or the scope of the claims attached hereto.

Thus the scope of the invention should be determined by the appended claims and their legal equivalents, rather than by the examples given.

What is claimed is:

1. A vertical axis wind turbine, comprising:
   a support structure anchor;
   a support structure having cable attaching means, said support structure further comprising an erection gin pole and a combined hold down and stabilizing gin pole;
   hinge means attached to said support structure and said support structure anchor to enable positioning said support structure and attachments in a horizontal or vertical position;
   a rotor shaft extending vertically upward from said support structure, said rotor shaft having blade attaching means;
   a lower bearing supporting said rotor shaft within said support structure;
   an upper bearing assembly having means for attaching cables thereto on a top end of said shaft;
   at lest three guy cables attached to said support structure cable attaching means;
   at least three guy cables attached to said upper rotor bearing assembly cable attaching means;
   at least two blades having curved aerodynamic external cross section are attached to said rotor shaft blade attaching means to cause said rotor shaft to rotate in response to wind energy; and
   a generator connected to said rotor shaft for producing electrical energy upon rotation of the turbine shaft by wind energy.

2. A wind turbine set forth in claim 1 wherein said hinge means comprises pivot members attached to said support structure and pivot members attach to said support structure anchor, a pivot pin rotationally connected to said pivot members, said support structure pivot members separate said support structure from said support structure anchor.

3. A wind turbine as set forth in claim 1 wherein said support structure further includes at least three adjustable length support bolts, said support bolts support the bottom of said support structure, when said support structure is in a vertical position.

4. A vertical axis wind turbine, comprising:
   a support structure anchor;
   a support structure having means for attaching guy cables, said support structure further comprises at least three adjustable length support bolts to support said support structure in a vertical position, said support structure having a cable attaching means;
   hinge means attached to said support and said support structure anchor to enable positioning said support structure and structure attachments in a horizontal or vertical position;
   a rotor shaft extending vertically upward from said support structure, said rotor shaft having blade attaching means;
   a lower bearing supporting said rotor shaft within said support structure;
   an upper bearing assembly having means for attaching cables thereto on a top end of said shaft;
   at least three guy cables attached to said support structure cable attaching means;
   at least three guy cables attached to said upper rotor bearing assembly cable attaching means;
   at least two blades having curved aerodynamic external cross section are attached to said rotor shaft blade attaching means to cause said rotor shaft to rotate in response to wind energy; and
   a generator connected to said rotor shaft for producing electrical energy upon rotation of the turbine shaft by wind energy.

5. A wind turbine set forth in claim 4 wherein said hinge means comprises pivot members attached to said support structure and pivot members attach to said support structure anchor, a pivot pin rotationally connected to said pivot members, said support structure pivot members separate said support structure from said support structure anchor.

6. A wind turbine as set forth in claim 4 wherein said support structure has attached an erection gin pole and a combination hold down and stabilizing gin pole.

7. A method of assembling and erecting a vertical axis wind turbine, comprising:

providing a support structure anchor;

hingably connecting a support structure to said support structure anchor with said support structure in a substantially horizontal position;

said support structure further including an erection gin pole and combination hold down and stabilizing gin pole;

said support structure further including a lower bearing and a hold down cable attaching means;

further providing a rotor shaft and an upper bearing assembly having cable attaching means;

attaching said rotor shaft lower end to said lower bearing further attaching said rotor shaft upper end to said upper bearing assembly and attaching at least three guy cables to said cable attaching means, further attaching at least two aerodynamic blades to said rotor shaft, further attaching an electric generator to said rotor shaft;

routing the highest guy cable over said erection gin pole and attaching to a support structure anchor mounted winch, further routing said other two guy cables over separate ends of combination hold down and stabilizing gin pole and attaching said other guy cable ends in tension to said support structure hold down cable attaching means, while said support structure is in a horizontal position;

hoisting said upper bearing assembly and said rotor shaft and said support structure about said hingable connection using said winch and attached upper bearing guy cable from a horizontal to a vertical position.

* * * * *